US007216348B1

(12) United States Patent
deCarmo

(10) Patent No.: US 7,216,348 B1
(45) Date of Patent: May 8, 2007

(54) METHOD AND APPARATUS FOR DYNAMICALLY BALANCING CALL FLOW WORKLOADS IN A TELECOMMUNICATIONS SYSTEM

(75) Inventor: Linden A. deCarmo, Plantation, FL (US)

(73) Assignee: Net2Phone, Inc., Newark, NJ (US)

( * ) Notice: Subject to any disclaimer, the term of this patent is extended or adjusted under 35 U.S.C. 154(b) by 0 days.

(21) Appl. No.: 09/477,101

(22) Filed: Jan. 4, 2000

Related U.S. Application Data

(60) Provisional application No. 60/114,751, filed on Jan. 5, 1999.

(51) Int. Cl.
*G06F 9/46* (2006.01)
*G06F 9/54* (2006.01)
*H04Q 7/20* (2006.01)

(52) U.S. Cl. .................. 718/105; 455/445; 455/453; 370/238; 370/237; 719/318; 719/314; 379/221.06

(58) Field of Classification Search ................ 709/100, 709/102, 105, 104; 718/1–108; 370/200–546; 455/1–575.9; 719/318, 314; 379/1.01–457
See application file for complete search history.

(56) References Cited

U.S. PATENT DOCUMENTS

| 4,446,519 A | 5/1984 | Thomas |
| 4,450,554 A | 5/1984 | Steensma et al. |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |

(Continued)

FOREIGN PATENT DOCUMENTS

AU             200059377 A1        11/2000

(Continued)

OTHER PUBLICATIONS

Lin et al., "A Dynamic Load-Balancing Policy With a Central Job Dispatcher", IEEE Transactions on Software Engineering, vol. 18, No. 2, pp. 148-158 (Feb. 1992).*

(Continued)

*Primary Examiner*—Lewis A. Bullock, Jr.
(74) *Attorney, Agent, or Firm*—Davidson Berquist Jackson & Gowdey, LLP

(57) ABSTRACT

A call flow server is disclosed that processes call flow events from a plurality of gateways bridging between traditional circuit-switched networks and packet-switched networks. The call flow server server, which may be implemented with either a single processor or multi-processor design, includes call flow engine and call flow thread manager modules capable of managing a plurality of call flow events by distributing the call flow scripts associated with such events among a plurality of threads executing on the call flow server. Each call flow event in the form of a call flow script is processed on a single thread within a selected processor. Processing each call flow script on a single thread fully utilizes the processor resources and ensures that a call flow script need not be blocked while another call flow script is running. The call flow server includes a thread manager to direct a given call flow script to a thread that has excess capacity.

19 Claims, 5 Drawing Sheets

U.S. PATENT DOCUMENTS

| | | | |
|---|---|---|---|
| 4,652,703 A | 3/1987 | Lu et al. | |
| 4,658,093 A | 4/1987 | Hellman | |
| 4,694,492 A | 9/1987 | Wirstrom et al. | |
| 4,740,963 A | 4/1988 | Eckley | |
| 4,782,485 A | 11/1988 | Gollub | |
| 4,799,153 A | 1/1989 | Hann et al. | |
| 4,800,488 A | 1/1989 | Agrawal et al. | |
| 4,809,271 A | 2/1989 | Kondo et al. | |
| 4,813,040 A | 3/1989 | Futato | |
| 4,819,228 A | 4/1989 | Baran et al. | |
| 4,821,263 A | 4/1989 | Lundh | |
| 4,866,704 A | 9/1989 | Bergman | |
| 4,866,732 A | 9/1989 | Carey et al. | |
| 4,873,715 A | 10/1989 | Shibata | |
| 4,887,265 A | 12/1989 | Felix | |
| 4,890,282 A | 12/1989 | Lambert et al. | |
| 4,899,333 A | 2/1990 | Roediger | |
| 4,912,705 A | 3/1990 | Paneth et al. | |
| 4,932,022 A | 6/1990 | Keeney et al. | |
| 4,962,449 A | 10/1990 | Schlesinger | |
| 4,981,371 A | 1/1991 | Gurak et al. | |
| 4,995,074 A | 2/1991 | Goldman et al. | |
| 5,031,089 A * | 7/1991 | Liu et al. | 709/226 |
| 5,036,513 A | 7/1991 | Greenblatt | |
| 5,056,140 A | 10/1991 | Kimbell | |
| 5,065,425 A | 11/1991 | Lecomte et al. | |
| 5,095,480 A | 3/1992 | Fenner | |
| 5,113,499 A | 5/1992 | Ankney et al. | |
| 5,121,385 A | 6/1992 | Tominaga et al. | |
| 5,127,001 A | 6/1992 | Steagall et al. | |
| 5,130,985 A | 7/1992 | Kondo et al. | |
| 5,150,360 A | 9/1992 | Perlman et al. | |
| 5,150,410 A | 9/1992 | Bertrand | |
| 5,155,726 A | 10/1992 | Spinney et al. | |
| 5,157,592 A | 10/1992 | Walters | |
| 5,159,592 A | 10/1992 | Perkins | |
| 5,166,931 A | 11/1992 | Riddle | |
| 5,187,591 A | 2/1993 | Guy et al. | |
| 5,204,669 A | 4/1993 | Dorfe et al. | |
| 5,212,789 A | 5/1993 | Rago | |
| 5,214,650 A | 5/1993 | Renner et al. | |
| 5,220,599 A | 6/1993 | Sasano et al. | |
| 5,224,095 A | 6/1993 | Woest et al. | |
| 5,241,594 A | 8/1993 | Kung | |
| 5,241,625 A | 8/1993 | Epard et al. | |
| 5,249,290 A | 9/1993 | Heizer | |
| 5,274,635 A | 12/1993 | Rahman et al. | |
| 5,282,197 A | 1/1994 | Kreitzer | |
| 5,283,819 A | 2/1994 | Glick et al. | |
| 5,287,103 A | 2/1994 | Kasprzyk et al. | |
| 5,291,554 A | 3/1994 | Morales | |
| 5,301,324 A * | 4/1994 | Dewey et al. | 709/105 |
| 5,305,312 A | 4/1994 | Fornek et al. | |
| 5,309,433 A | 5/1994 | Cidon et al. | |
| 5,309,437 A | 5/1994 | Perlman et al. | |
| 5,315,705 A | 5/1994 | Iwami et al. | |
| 5,319,705 A | 6/1994 | Halter et al. | |
| 5,321,813 A | 6/1994 | McMillen et al. | |
| 5,327,486 A | 7/1994 | Wolff et al. | |
| 5,335,276 A | 8/1994 | Thompson et al. | |
| 5,341,374 A | 8/1994 | Lewen et al. | |
| 5,347,632 A | 9/1994 | Filepp et al. | |
| 5,357,571 A | 10/1994 | Banwart | |
| 5,377,260 A | 12/1994 | Long | |
| 5,396,485 A | 3/1995 | Ohno et al. | |
| 5,400,335 A | 3/1995 | Yamada | |
| 5,410,754 A | 4/1995 | Favreau et al. | |
| 5,425,028 A | 6/1995 | Britton et al. | |
| 5,428,608 A | 6/1995 | Freeman et al. | |
| 5,430,709 A | 7/1995 | Galloway | |
| 5,430,727 A | 7/1995 | Callon | |
| 5,432,846 A | 7/1995 | Norio | |
| 5,434,797 A | 7/1995 | Barris | |
| 5,434,913 A | 7/1995 | Tung et al. | |
| 5,440,547 A | 8/1995 | Easki et al. | |
| 5,442,633 A | 8/1995 | Perkins et al. | |
| 5,446,891 A | 8/1995 | Kaplan et al. | |
| 5,446,919 A | 8/1995 | Wilkins | |
| 5,452,296 A | 9/1995 | Shimizu | |
| 5,455,854 A | 10/1995 | Dilts et al. | |
| 5,457,683 A | 10/1995 | Robins | |
| 5,457,738 A | 10/1995 | Sylvan | |
| 5,459,864 A * | 10/1995 | Brent et al. | 718/105 |
| 5,461,611 A | 10/1995 | Drake, Jr. et al. | |
| 5,463,625 A | 10/1995 | Yasrebi | |
| 5,465,286 A | 11/1995 | Clare et al. | |
| 5,467,388 A | 11/1995 | Redd et al. | |
| 5,469,500 A | 11/1995 | Satter et al. | |
| 5,473,531 A | 12/1995 | Flora-Holmquist et al. | |
| 5,474,741 A | 12/1995 | Mikeska et al. | |
| 5,474,819 A | 12/1995 | Chambers et al. | |
| 5,475,741 A | 12/1995 | Davis et al. | |
| 5,475,819 A | 12/1995 | Miller et al. | |
| 5,479,411 A | 12/1995 | Klein | |
| 5,481,720 A | 1/1996 | Loucks et al. | |
| 5,483,524 A | 1/1996 | Lev et al. | |
| 5,487,100 A | 1/1996 | Kane | |
| 5,491,800 A | 2/1996 | Goldsmith et al. | |
| 5,499,295 A | 3/1996 | Cooper | |
| 5,500,890 A | 3/1996 | Rogge et al. | |
| 5,509,058 A | 4/1996 | Sestak et al. | |
| 5,517,432 A | 5/1996 | Chandra et al. | |
| 5,517,494 A | 5/1996 | Green | |
| 5,524,110 A | 6/1996 | Danneels et al. | |
| 5,524,141 A | 6/1996 | Braun et al. | |
| 5,524,254 A | 6/1996 | Morgan et al. | |
| 5,526,489 A | 6/1996 | Nilakantan et al. | |
| 5,528,671 A | 6/1996 | Ryu et al. | |
| 5,533,102 A | 7/1996 | Robinson et al. | |
| 5,533,110 A | 7/1996 | Pinard et al. | |
| 5,544,164 A | 8/1996 | Baran | |
| 5,544,303 A | 8/1996 | Maroteaux et al. | |
| 5,544,322 A | 8/1996 | Cheng et al. | |
| 5,546,448 A | 8/1996 | Caswell et al. | |
| 5,546,452 A | 8/1996 | Andrews et al. | |
| 5,546,582 A | 8/1996 | Brockmeyer et al. | |
| 5,548,636 A | 8/1996 | Bannister et al. | |
| 5,548,694 A | 8/1996 | Frisken Gibson | |
| 5,563,882 A | 10/1996 | Bruno et al. | |
| 5,574,774 A | 11/1996 | Ahlberg et al. | |
| 5,574,934 A | 11/1996 | Mirashrafi et al. | |
| 5,581,552 A | 12/1996 | Civanlar et al. | |
| 5,586,257 A | 12/1996 | Perlman | |
| 5,586,260 A | 12/1996 | Hu | |
| 5,591,800 A | 1/1997 | Goldsmith et al. | |
| 5,604,737 A | 2/1997 | Iwami et al. | |
| 5,606,669 A | 2/1997 | Bertin et al. | |
| 5,608,786 A | 3/1997 | Gordon | |
| 5,614,940 A | 3/1997 | Cobbley et al. | |
| 5,619,557 A | 4/1997 | Van Berkum | |
| 5,623,483 A | 4/1997 | Agrawal et al. | |
| 5,623,490 A | 4/1997 | Richter et al. | |
| 5,623,605 A | 4/1997 | Keshav et al. | |
| 5,625,407 A | 4/1997 | Biggs et al. | |
| 5,636,282 A | 6/1997 | Holmquist et al. | |
| 5,636,346 A | 6/1997 | Saxe | |
| 5,642,156 A | 6/1997 | Saiki | |
| 5,644,629 A | 7/1997 | Chow | |
| 5,651,006 A | 7/1997 | Fujino et al. | |
| 5,652,759 A | 7/1997 | Stringfellow, Jr. | |
| 5,655,120 A * | 8/1997 | Witte et al. | 709/105 |
| 5,659,542 A | 8/1997 | Bell et al. | |
| 5,659,596 A | 8/1997 | Dunn | |
| 5,668,862 A | 9/1997 | Bannister et al. | |

| | | | | | | |
|---|---|---|---|---|---|---|
| 5,671,428 A | 9/1997 | Muranaga et al. | | 5,828,846 A | 10/1998 | Kirby et al. |
| 5,675,507 A | 10/1997 | Bobo | | 5,832,119 A | 11/1998 | Rhoads |
| 5,680,392 A | 10/1997 | Semaan | | 5,832,240 A | 11/1998 | Larsen et al. |
| 5,684,800 A | 11/1997 | Dobbins et al. | | 5,835,720 A | 11/1998 | Nelson et al. |
| 5,684,951 A | 11/1997 | Goldman et al. | | 5,835,723 A | 11/1998 | Andrews et al. |
| 5,689,553 A | 11/1997 | Ahuja et al. | | 5,835,725 A | 11/1998 | Chiang et al. |
| 5,692,180 A | 11/1997 | Lee | | 5,838,683 A | 11/1998 | Corley et al. |
| 5,692,192 A * | 11/1997 | Sudo ........................ 709/105 | | 5,838,970 A | 11/1998 | Thomas |
| 5,694,594 A | 12/1997 | Chang | | 5,841,769 A | 11/1998 | Okanoue et al. |
| 5,701,463 A | 12/1997 | Malcolm | | 5,842,216 A | 11/1998 | Anderson et al. |
| 5,708,422 A | 1/1998 | Blonder et al. | | 5,848,143 A | 12/1998 | Andrews et al. |
| 5,708,655 A | 1/1998 | Toth et al. | | 5,848,396 A | 12/1998 | Gerace |
| 5,710,884 A | 1/1998 | Dedrick | | 5,854,901 A | 12/1998 | Cole et al. |
| 5,717,923 A | 2/1998 | Dedrick | | 5,857,072 A | 1/1999 | Crowle |
| 5,719,786 A | 2/1998 | Nelson et al. | | 5,864,684 A | 1/1999 | Nielsen |
| 5,721,827 A | 2/1998 | Logan et al. | | 5,867,654 A | 2/1999 | Ludwig et al. |
| 5,724,092 A | 3/1998 | Davidsohn et al. | | 5,867,665 A | 2/1999 | Butman et al. |
| 5,724,412 A | 3/1998 | Srinivasan | | 5,872,850 A | 2/1999 | Klein et al. |
| 5,724,506 A | 3/1998 | Cleron et al. | | 5,872,922 A | 2/1999 | Hogan et al. |
| 5,726,984 A | 3/1998 | Kubler et al. | | 5,872,972 A * | 2/1999 | Boland et al. ............... 709/102 |
| 5,729,748 A | 3/1998 | Robbins et al. | | 5,884,032 A | 3/1999 | Bateman et al. |
| 5,732,078 A | 3/1998 | Arango | | 5,884,035 A | 3/1999 | Butman et al. |
| 5,734,828 A | 3/1998 | Pendse et al. | | 5,884,077 A * | 3/1999 | Suzuki ........................ 709/105 |
| 5,740,231 A | 4/1998 | Cohn et al. | | 5,890,162 A | 3/1999 | Huckins |
| 5,742,668 A | 4/1998 | Pepe et al. | | 5,892,825 A | 4/1999 | Mages et al. |
| 5,742,675 A | 4/1998 | Kilander et al. | | 5,892,903 A | 4/1999 | Klaus |
| 5,742,762 A | 4/1998 | Scholl et al. | | 5,892,924 A | 4/1999 | Lyon et al. |
| 5,742,905 A | 4/1998 | Pepe et al. | | 5,903,721 A | 5/1999 | Sixtus |
| 5,745,642 A | 4/1998 | Ahn | | 5,903,723 A | 5/1999 | Beck et al. |
| 5,745,702 A | 4/1998 | Morozumi | | 5,903,727 A | 5/1999 | Nielsen |
| 5,751,712 A | 5/1998 | Farwell et al. | | 5,905,719 A | 5/1999 | Arnold et al. |
| 5,751,961 A | 5/1998 | Smyk | | 5,905,736 A | 5/1999 | Ronen et al. |
| 5,754,636 A | 5/1998 | Bayless et al. | | 5,905,865 A | 5/1999 | Palmer et al. |
| 5,754,939 A | 5/1998 | Herz et al. | | 5,905,872 A | 5/1999 | DeSimone et al. |
| 5,758,257 A | 5/1998 | Herz et al. | | 5,915,001 A | 6/1999 | Uppaluru |
| 5,761,606 A | 6/1998 | Wolzien | | 5,924,093 A * | 7/1999 | Potter et al. .................... 707/7 |
| 5,764,736 A | 6/1998 | Shachar et al. | | 5,925,103 A | 7/1999 | Magallanes et al. |
| 5,764,741 A | 6/1998 | Barak | | 5,928,327 A | 7/1999 | Wang et al. |
| 5,764,756 A | 6/1998 | Onweller | | 5,929,849 A | 7/1999 | Kikinis |
| 5,767,897 A | 6/1998 | Howell | | 5,937,162 A | 8/1999 | Funk et al. |
| 5,768,527 A | 6/1998 | Zhu et al. | | 5,946,386 A | 8/1999 | Rogers et al. |
| 5,771,355 A | 6/1998 | Kuzma | | 5,946,629 A | 8/1999 | Sawyer et al. |
| 5,774,660 A | 6/1998 | Brendel et al. | | 5,950,123 A | 9/1999 | Schwelb et al. |
| 5,774,666 A | 6/1998 | Portuesi | | 5,950,172 A | 9/1999 | Klingman |
| 5,778,181 A | 7/1998 | Hidary et al. | | 5,953,350 A | 9/1999 | Higgins |
| 5,778,187 A | 7/1998 | Monteiro et al. | | 5,956,482 A | 9/1999 | Agraharam et al. |
| 5,784,564 A | 7/1998 | Camaisa et al. | | 5,961,584 A * | 10/1999 | Wolf ........................ 709/103 |
| 5,784,619 A | 7/1998 | Evans et al. | | 5,964,872 A | 10/1999 | Turpin |
| 5,787,253 A | 7/1998 | McCreery et al. | | 5,969,967 A | 10/1999 | Aahlad et al. |
| 5,790,548 A | 8/1998 | Sistanizadeh et al. | | 5,982,774 A | 11/1999 | Foladare et al. |
| 5,790,792 A | 8/1998 | Dudgeon et al. | | 5,983,005 A | 11/1999 | Monteiro et al. |
| 5,790,793 A | 8/1998 | Higley | | 5,999,965 A | 12/1999 | Kelly |
| 5,790,803 A | 8/1998 | Kinoshita et al. | | 6,005,870 A | 12/1999 | Leung |
| 5,793,365 A | 8/1998 | Tang et al. | | 6,006,257 A | 12/1999 | Slezak |
| 5,794,018 A | 8/1998 | Vrvilo et al. | | 6,009,469 A | 12/1999 | Mattaway et al. |
| 5,794,257 A | 8/1998 | Liu et al. | | 6,014,379 A | 1/2000 | White et al. |
| 5,796,394 A | 8/1998 | Wicks et al. | | 6,014,710 A | 1/2000 | Talluri et al. |
| 5,799,063 A | 8/1998 | Krane | | 6,016,393 A | 1/2000 | White et al. |
| 5,799,072 A | 8/1998 | Vulcan et al. | | 6,018,768 A | 1/2000 | Ullman et al. |
| 5,799,150 A | 8/1998 | Hamilton et al. | | 6,018,771 A | 1/2000 | Hayden |
| 5,805,587 A | 9/1998 | Norris et al. | | 6,021,126 A | 2/2000 | White et al. |
| 5,805,810 A | 9/1998 | Maxwell | | 6,026,086 A | 2/2000 | Lancelot et al. |
| 5,805,822 A | 9/1998 | Long et al. | | 6,026,425 A * | 2/2000 | Suguri et al. ................ 709/105 |
| 5,809,233 A | 9/1998 | Shur | | 6,029,175 A | 2/2000 | Chow et al. |
| 5,812,819 A | 9/1998 | Rodwin et al. | | 6,031,836 A | 2/2000 | Haserodt |
| 5,815,665 A | 9/1998 | Teper et al. | | 6,032,192 A | 2/2000 | Wegner et al. |
| 5,816,919 A | 10/1998 | Scagnelli et al. | | 6,041,345 A | 3/2000 | Levi et al. |
| 5,818,510 A | 10/1998 | Cobbley et al. | | 6,047,054 A | 4/2000 | Bayless et al. |
| 5,818,836 A | 10/1998 | DuVal | | 6,047,292 A | 4/2000 | Kelly et al. |
| 5,822,524 A | 10/1998 | Chen et al. | | 6,055,594 A | 4/2000 | Lo et al. |
| 5,825,865 A | 10/1998 | Oberlander et al. | | 6,061,716 A | 5/2000 | Moncreiff |
| 5,828,837 A | 10/1998 | Eikeland | | 6,064,975 A | 5/2000 | Moon et al. |
| 5,828,843 A | 10/1998 | Grimm et al. | | 6,065,048 A | 5/2000 | Higley |

| | | | |
|---|---|---|---|
| 6,069,890 A | 5/2000 | White et al. | |
| 6,085,217 A * | 7/2000 | Ault et al. | 709/105 |
| 6,101,182 A | 8/2000 | Sistanizadeh et al. | |
| 6,105,053 A * | 8/2000 | Kimmel et al. | 718/105 |
| 6,108,704 A | 8/2000 | Hutton et al. | |
| 6,122,255 A | 9/2000 | Bartholomew et al. | |
| 6,125,113 A | 9/2000 | Farris et al. | |
| 6,131,121 A | 10/2000 | Mattaway et al. | |
| 6,151,643 A | 11/2000 | Cheng et al. | |
| 6,154,445 A | 11/2000 | Farris et al. | |
| 6,163,316 A | 12/2000 | Killian | |
| 6,173,044 B1 | 1/2001 | Hortensius et al. | |
| 6,178,453 B1 | 1/2001 | Mattaway et al. | |
| 6,181,689 B1 | 1/2001 | Choung et al. | |
| 6,185,184 B1 | 2/2001 | Mattaway et al. | |
| 6,188,677 B1 | 2/2001 | Oyama et al. | |
| 6,195,357 B1 | 2/2001 | Polcyn | |
| 6,198,303 B1 | 3/2001 | Rangasayee | |
| 6,205,135 B1 | 3/2001 | Chinni et al. | |
| 6,212,625 B1 | 4/2001 | Russell | |
| 6,226,678 B1 | 5/2001 | Mattaway et al. | |
| 6,226,690 B1 | 5/2001 | Banda et al. | |
| 6,240,444 B1 | 5/2001 | Fin et al. | |
| 6,243,373 B1 | 6/2001 | Turock | |
| 6,266,539 B1 | 7/2001 | Pardo | |
| 6,275,490 B1 | 8/2001 | Mattaway et al. | |
| 6,282,272 B1 | 8/2001 | Noonen et al. | |
| 6,289,369 B1 * | 9/2001 | Sundaresan | 718/103 |
| 6,300,863 B1 | 10/2001 | Cotichini et al. | |
| 6,338,078 B1 * | 1/2002 | Chang et al. | 709/102 |
| 6,343,115 B1 | 1/2002 | Foladare et al. | |
| 6,347,085 B2 | 2/2002 | Kelly | |
| 6,347,342 B1 | 2/2002 | Marcos et al. | |
| 6,377,568 B1 | 4/2002 | Kelly | |
| 6,385,583 B1 | 5/2002 | Ladd et al. | |
| 6,393,455 B1 * | 5/2002 | Eilert et al. | 709/105 |
| 6,427,064 B1 | 7/2002 | Henderson | |
| 6,463,565 B1 | 10/2002 | Kelly | |
| 6,477,586 B1 * | 11/2002 | Achenson et al. | 709/330 |
| 6,513,066 B1 | 1/2003 | Hutton et al. | |
| 6,594,254 B1 | 7/2003 | Kelly | |
| 6,687,738 B1 | 2/2004 | Hutton | |
| 6,701,365 B1 | 3/2004 | Hutton | |
| 6,704,802 B1 | 3/2004 | Finch et al. | |
| 6,728,784 B1 | 4/2004 | Mattaway | |
| 6,829,645 B1 | 12/2004 | Hutton | |
| 6,888,836 B1 | 5/2005 | Cherkasova | |
| 6,909,708 B1 * | 6/2005 | Krishnaswamy et al. | 370/352 |

FOREIGN PATENT DOCUMENTS

| | | |
|---|---|---|
| AU | 200059378 A1 | 11/2000 |
| AU | 200059379 A1 | 11/2000 |
| EP | 0455402 A2 | 11/1991 |
| EP | 0518596 | 12/1992 |
| EP | 0556012 A2 | 8/1993 |
| EP | 0559047 | 9/1993 |
| EP | 0581722 | 2/1994 |
| EP | 0597691 | 5/1994 |
| EP | 0632672 | 1/1995 |
| EP | 0648038 | 4/1995 |
| EP | 1379039 A2 | 1/2004 |
| EP | 1379050 A2 | 1/2004 |
| GB | 2283645 | 5/1995 |
| JP | 5944140 | 3/1984 |
| JP | 63-131637 | 3/1988 |
| WO | WO-9219054 | 10/1992 |
| WO | WO-9422087 | 9/1994 |
| WO | WO-9714234 | 4/1997 |
| WO | WO-9811704 | 3/1998 |

OTHER PUBLICATIONS

"Circuit Switching", Ericsson, last published Jul. 5, 2001, found at http://www.ericsson.com/multiservicenetworks/circuitswitching/axe/ printed on Aug. 1, 2001, 2 pages.

"Data Communication Over the Telephone Network", International Telecommunication Union, CCITT The International Telegraph and Telephone Consultative Committee, Blue Book, vol. VIII—Fascicle VIII.1, IXth Plenary Assembly, Melbourne, Nov. 14-25, 1988, pp. 296-370.

"Full Duplex Speakerphone", IBM Technical Disclosure Bulletin, vol. 29, No. 12, May 1987, pp. 5599-5602.

"ICL OPD—One Per Desk", Issue Aug. 1, 1990, A Comprehensive Technical Information Document (24 pages).

"Information Processing Techniques Program. vol. II. Wideband Integrated Voice/Data Technology" Semiannual Technical Summary Report, Massachusetts Institute of Technology Lexington, MA, Oct. 1, 1977-Mar. 31, 1978, Issued Aug. 31, 1978, pp. 1-25 and 27-31 ADA067014.

"Integrated Voice/Data PABX Communications", IBM Technical Disclosure Bulletin, Sep. 1986, http://patents.ibm.com.

"Level 1-5 of 65 Stories" 1990 Network World, Inc., Apr. 16, 1990, pp. 114-115.

"Multi-Service Networks", Ericsson, last published Jun. 27, 2001, found at http://www.ericsson.com/multiservicenetworks/circuitswitching/ printed on Aug. 1, 2001, 2 pages.

"The History of TPC.INT", Jan. 15, 1999, 2 pages, found at http://www.tpc.int/faq/history.html printed on Aug. 8, 2002.

A. A. Kapauan, et al. "Wideband Packet Access for Workstations: Integrated Voice/Data/Image Services on the UNIX+ PC", IEEE Global Telecommunications Conference, Houston, Texas, Dec. 1-4, 1986, Conference Record vol. 3, pp. 1439-1441.

Ahrens, Richard L., "Frequently-Asked Questions about Internet VoiceChat 1.1 FAQ Version: 1.0", 1994, 6 pages.

Andy Hopper "Pandora—An Experimental System for Multimedia Applications", Operating Systems Review, Jan. 12, 1990, pp. 1-16.

Bennett, Geoff, "Designing TCP/IP Internetworks", Chapter 11, pp. 290, 291 and 323, Van Nostrand Reinhold, 1995.

Bernard Gold "Digital Speech Networks", Proceedings of the IEEE, vol. 65, No. 12, Dec. 1977, pp. 1636-1658.

Bill Newman "An ISDN Data and Voice Terminal Based on a Personal Computer", Globecom'85, IEEE Global Telecommunications Conference, Conference Record vol. 3, New Orleans, Louisiana, Dec. 2-5, 1985, pp. 1048-1052.

Borland, John, "Technology uses one number to find you on any device", May 17, 2001, 3 pages, found at http://news.cnet.com/news/0-1004-201-5939191-0.html.

C. Malamud et al., "Principles of Operation for the TPC.INT Subdomain: General Principles and Policy", RFC 1530, Oct. 1993, pp. 1-7.

C. Malamud et al., "Principles of Operation for the TPC.INT Subdomain: Remote Printing—Administrative Policies", RFC 1529, Oct. 1993, pp. 1-5.

C. Malamud et al., "Principles of Operation for the TPC.INT Subdomain: Remote Printing—Technical Procedures", RFC 1528, Oct. 1993, pp. 1-12.

C. Topolcic "Experimental Internet Stream Protocol. Version 2 (ST-II)", Request for Comments 1990, Oct. 1990, pp. 1-148.

C. Yang, "INETPhone: Telephone Services and Servers on Internet", Request for Comments 1789, pp. 1-6, Apr. 1995.

Carl A. Sunshine, et al. "Broad-Band Personal Computer LAN's", IEEE Journal on Selected Areas in Communications, vol. SAC-3, No. 3, May 1985, pp. 408-415.

Cindy Mueller et al., "ATD Data Services", http://www.iita.ucar.edu/ws/datawkshop/Abstract-ATD.html, Jan. 5, 1995, 2 pages.

Clifford J. Weinstein, et al. "Experience with Speech Communication in Packet Networks" IEEE Journal on Selected Areas in Communications, vol. SAC-1, No. 6, (ISSN 0733-8716), Dec. 1983, pp. 963-980.

Comer, Douglas E., "Internetworking with TCP/IP" Principles, Protocols and Architecture, vol. 1, 2nd edition, Prentice Hall Publishing, Englewood Cliffs, Nov. 11, 1991, cover page and pp. vii-xvii, 1-3, 17-19 and 311-333.

D. Adolphs, et al. "Adapters for the Public ISDN", pp. 72-80.

D. Perkins "The Point-to-Point Protocol for the Transmission of Multi-Protocol Datagrams Over Point-to-Point Links", Request for Comments 1171, ftp://ftp.isi.edu/in-notes/rfc1171.txt, Jul. 1990, pp. 1-48.

D.C. Swinehart et al., "Adding Voice to an Office Computer Network", IEEE Global Telecommunications Conference, Nov. 28-Dec. 1, 1983, Conference Record vol. 1 of 3, pp. 392-398.

Dale Gulick et al., "Interface the ISDN to Your PC With a Voice/Data Board", Design Applications, 2328 Electronic Design, 35 (1987) Dec. 10, No. 29, Hashbrouck Heights, NJ, USA, pp. 85-88, XP 000004313.

Daniel C. Swinehart "Telephone Management in the Etherphone System", IEEE/IEICE Global Telecommunications Conference '87, Conference Record vol. 2 of 3, Nov. 15-18, 1987, pp. 1176-1180.

Danny Cohen "A Network Voice Protocol NVP-II", Apr. 1, 1981, pp. 1-68.

Danny Cohen "Packet Communication of Online Speech", AFIPS Conference Proceedings, 1981 National Computer Conference, May 4-7, 1981, Chicago, Illinois, pp. 169-176.

Danny Cohen "Specifications for the Network Voice Protocol (NVP)", Request for Comments 741, Jan. 29, 1976, pp. 1-30.

December, John and Randall, Neil, "The World Wide Web Unleashed", Sams Publishing, Indianapolis, IN, 1994, ISBN 0-672-30617-4, 23 pages.

Don H. Johnson, et al. "A Local Access Network for Packetized Digital Voice Communication", IEEE Transactions on Communications, vol. Com. 29, No. 5, May 1981, pp. 679-688.

Douglas B. Terry and Daniel C. Swinehart, "Managing Stored Voice in the Etherphone System", 1987 ACM 089791-242-X/87/0011/0103, pp. 103-104.

Douglas B. Terry and Daniel C. Swinehart, "Managing Stored Voice in the Etherphone System", ACM Transactions on Computer Systems, vol. 6, No. 1, Feb. 1988, pp. 3-27.

Edward J. Weinburg, "Netscape Conference and Cooltalk Meeting Room", www.q5.com, Feb. 22, 1996, 7 pages.

Eve M. Schooler, et al. "A Packet-Switched Multimedia Conferencing System", SIGOIS Bulletin, pp. 12-22.

Gary C. Kessler "ISDN Concepts, Facilities, and Services", McGraw-Hill, Inc., c1990, pp. 224-231, ISBN 0-07-034242-3.

Giulio Barberis, et al. "Coded Speech in Packet-Switched Networks: Models and Experiments" IEEE Journal on Selected Areas in Communications, vol. SAC-1, No. 6, Dec. 1983, pp. 1028-1038.

Gull, "Getting IP Address of PPP-Connected Mac", <jgull-030495100535001@pm012-11.dialip.mich.net>, Apr. 3, 1995, 2 pages.

Gull, "Internet Phone for Mac?", <jgull-1704950116450001@pm049-28.dialip.mich.net>, Apr. 17, 1995, 2 pages.

H. Jonathan Chao, et al. "A Packet Video System Using the Dynamic Time Division Multiplexing Technique", IEEE Global Telecommunications Conference, Houston, Texas, Dec. 1-4, 1988, Conference Record, vol. 3, pp. 0767-0772.

H. Opderbeck "Throughput Degredations for Single Packet Messages", Request for Comments 632, ftp://ftp.isi.edu/in-notes/rfc632.txt, May 20, 1974, pp. 1-6.

Harrick M. Vin, et al. "Multimedia Conferencing in the Etherphone Environment", IEEE, Oct. 1991, pp. 69-79.

Henning Schulzrinne "Voice Communication Across the Internet: A Network Voice Terminal", Jun. 29, 1992, pp. 1-34.

Heylighen, Francis, "World-Wide Web: a distributed hypermedia paradigm for global networking", IEE/INSPEC Database Updates and Additions (1960-1995), Proceedings. SHARE Europe Spring Conference, Apr. 18, 1994, pp. 355-368.

Hiroshi Kobayashi and Hideaki Haruyama, "Voice, Data and Video Integrated Broadband Metropolitan Area Network", Electronics and Communications in Japan, Part 1, vol. 73, No. 11, 1990, pp. 34-42.

Hiroyuki Ichikawa et al. "High-Speed Packet Switching Systems for Multimedia Communications", IEEE Journal on Selected Areas in Communications, Oct. 1987, vol. SAC-5, No. 8 (ISSN 0733-8716), pp. 1336-1345.

Ian H. Merritt "Providing Telephone Line Access to a Packet Voice Network", University of Southern California, Marina Del Rey. Information Sciences Inst. Feb. 1983, ADA126270.

Inder Gopal et al., "Directories for Networks with Casually Connected Users", IEEE, 1988.

International Preliminary Examination Report (IPER) issued Mar. 26, 1998 in corresponding International Application Serial No. PCT/US96/15504.

International Search Report issued Jan. 27, 1998 in corresponding International Application Serial No. PCT/US96/15504.

Israel Gitman, et al. "Economic Analysis of Integrated Voice and Data Networks: A Case Study" Proceedings of the IEEE, vol. 66, No. 11, Nov. 1978, pp. 1549-1570.

J. Huelamo, et al. "End User Premises Equipment and Terminals for Broadband Applications", Electrical Communication, vol. 64, No. 2/3, 1990.

J. K. Reynolds et al., Voice File Interchange Protocol (VFIP), Request for Comments 978, ftp://ftp.isi.edu/innotes/rfc978.txt, Feb. 1986, pp. 1-5.

J. Romkey "A Nonstandard For Transmission of IP Datagrams Over Serial Lines: Slip", Request for Comments 1055, ftp://ftp.isi.edu/in-notes/std/std47.txt, Jun. 1988, pp. 1-6.

James D. Mills, et al. "A data and voice system for the general service telephone network", Proceedings IECON '87, 1987 International Conference on IND. Electronics, Control, and Instrumentation, Cambridge, Massachusetts, Nov. 3-6, 1987.

James W. Forgie "Speech Transmission in Packet-Switched Store-and-Forward Networks", AFIPS Conference Proceedings, 1975 National Computer Conference, May 19-22, 1975, Anaheim, California, pp. 137-142.

James W. Forgie "Voice Conferencing in Packet Networks", ICC '80, Conference Record, International Conference on Communications, Seattle, WA, Jun. 8-12, 1980, vol. 1, 80CH1505-6 CSCB, pp. 21.3.1-21.3.4.

Jane's Military Communications 1979-80, pp. 452 and 453.

Jane's Military Communications 1985, pp. 585, 546, and 545.

Jane's Military Communications 1989, Tenth Edition, Edited by John Williamson, ISBN 0710608772, pp. 443, 507, and 512.

Jane's Military Communications 1990-91, Eleventh Edition, Edited by John Williamson, ISBN 0710609000, pp. [30], 264, 357, 398, 406, 450, 454, 456, 560, 572, 573, 814, 815, and 816.

Jane's Military Communications 1992-93, Thirteenth Edition, Edited by John Williamson, ISBN 0710609809, pp. 375, 376, 384, and 704.

Jim Stevens, "Much More Idle Chatter About Reference Models", http://www-mice.cs.ucl.ac.uk/multimedia/misc/tcp_ip/8709.mm.www/0041.html, Dec. 18, 1987, pp. 1-9.

John Bellamy, "Digital Telephony", c1982 John Wiley & Sons, Inc., pp. 392-397 and 410-412.

K. Sohraby, et al. "ISDN Primary Rate Interface Impact on Performance of Integrated Voice and Data on CSMA/CD Networks—A Measurement and Simulation Study", Globecom '90 IEEE Global Telecommunication Conference & Exhibition, San Diego, California, Dec. 2-5 1990 vol. 2 pp. 0912-0919.

Ken Sherman "Data Communications—A User's Guide", 3rd Edition, c1981 Prentice-Hall, Inc., pp. 296-307 and 404-407.

Kevin Jefffay, et al. "Kernel Support for Live Digital Audio and Video", pp. 10-21, University of North Carolina at Chapel Hill, Department of Computer Science.

Kyuta Saito, et al. "Voice Packet Communication System for Private Networks", Globecom '89, IEEE Global Telecommunications Conference & Exhibition, Dallas, Texas, Nov. 27-30, 1989, vol. 3, pp. 1874-1878.

Lawrence G. Roberts "The Evolution of Packet Switching", Proceedings of the IEEE, vol. 66, No. 11, Nov. 1978, pp. 1307-1313.

M. E. Ulug, et al. "Statistical Multiplexing of Data and Encoded Voice in a Transparent Intelligent Network", Fifth Data Communications Symposium, Sep. 27-29, 1977, Snowbird, Utah, pp. 6-14-6-20.

M. Gopalakrishnan, et al. "Integrating Voice and Data SALAN: An Experimtental Local Area Network", Computer Communications, vol. 9, No. 4, Aug. 1986, pp. 186-194 and p. 169.

M.J. Ross "Alternatives for Integrating Voice and Data", 1981 International Switching Symposium, ISS'81 CIC Montreal, Sep. 21-25, 1981.

Natesa Janakiraman "An Overview of Recent Developments in the Designs and Applications of Customer Premises Switches", IEEE Communications Magazine, Oct. 1985, vol. 23, No. 10, pp. 32-45.

P. Borgnis-Desbordes, et al. "Variable-Speed Data Transmission", IBM Technical Disclosure Bulletin, vol. 27, No. 4A, Sep. 1984, pp. 2269-2270.

P. Venkat Rangan and Daniel C. Swinehart, "Software Architecture for Integration of Video Services in the Etherphone System", IEEE Journal on Selected Areas in Communication, vol. 9, No. 9, Dec. 1991, pp. 1395-1404.

Paul Gilster, "Internet Navigator", Maruzen Kabushiki-Kaisha (1st Ed.), pp. 473-476, Feb. 28, 1995.

Philip H. Reagan, "Is it the PBX or is it the LAN?", Datamation, The Telecom Manager Emerges, Mar. 1984, vol. 30 No. 3, pp. 3-4, 147, 148, 150.

Polle T. Zellweger et al., "An Overview of the Etherphone System and its Applications", 2nd IEEE Conference on Computer Workstations, Mar. 7-10, 1988, pp. 160-168.

R. Braudes et al., "Requirements for Multicast Protocols", Request for Comments 145B, Network Working Group, May 1993, pp. 1-19.

R. W. Meba, et al. "Experiments in Wideband Packet Technology", Digital Communications—New Directions in Switching and Networks, Proceedings of the International Seminar, Zurich, Switzerland, Mar. 11-13, 1986, pp. 135-139.

R.P. McNamara, "Some Considerations of the Voice-Data Capabilities of Broadband Cable Networks", IEEE Digest of Papers Spring CompCon 82, Feb. 22-25, 1982, pp. 312-314.

Randy Cole "Packet Voice: When It Makes Sense", Speech Technology, Sep./Oct. 1982, pp. 52-61.

Scott Flinn, "Coordinating Heterogeneous Time-Based Media Between Independent Applications" ACM Multimedia 95—Electronic Proceedings Nov. 5-9, 1995, pp. 1-16.

Shimmi Hattori et al., "Integrated Digital Switching System with Queueing Storage Facility"; IEEE Transactions on Communications, vol. Com-30, No. 8, Aug. 1982, pp. 1900-1905, (ISSN 0090-6778).

Steve Oltmanns, et al. "A Voice and Communications System for the IBM PC", Speech Technology, Mar./Apr. 1986, pp. 94-99.

Stuart Cheshire et al., "Internet Mobility 4×4", www.acm.org, 1996, pp. 1-12.

Susan Angebranndt et al., "Integrating Audio and Telephony in a Distributed Workstation Environment", Proceedings of the Summer 1991 USENIX Conference, Jun. 10-14, 1991, Nashville, Tennessee, pp. 419-435.

T. Kamae "Visual Terminals and User Interfaces", FGCS North-Holland, pp. 257-278.

T. Kamae, "Voice/Data Integration in the INS Model System and Local Area Networks" IEEE Communications Magazine, Dec. 1986, vol. 24, No. 12, pp. 7-15.

T7540 Digital Telephone Codec, AT&T Microelectronics, Jan. 1991, pp. 1-62 and Data Sheet Addendum, Jul. 1991, 4 pages.

Takashi Yamada, et al. "New Technologies—Multimedia High-throughput X.25 Packet Switching System", NTT Review, vol. 1, No. 2, Jul. 1989, pp. 82-88.

Tamohiro Kawai, "Debut of Call Software in Internet", Nikkei Communications, No. 202, pp. 29-30, Nikkei BP, Jul. 17, 1995.

Theodore Bially, et al. "Voice Communication in Integrated Digital Voice and Data Networks", IEEE Transactions on Communications, vol. Com-28, No. 9, Sep. 1980, pp. 1478-1490.

Toru Tsuda, et al. "An Approach to Multi-Service Subscriber Loop System Using Packetized Voice/Data Terminals" ISSLS '78, The International Symposium on Subscriber Loops and Services, Mar. 20-24, 1978, Atlanta, Georgia, Conference Record, pp. 161-165.

V. Jacobson, et al. "TCP Extension for High-Speed Paths", Request for Comments 1185, ftp://ftp.isi.edu/in-notes/rfc1185.txt, Oct. 1990, pp. 1-21.

V. Jacobson, et al. "TCP Extensions for High Performance", Request for Comments 1323, ftp://ftp.isi.edu/in-notes/rfc1323.txt, May 1992, pp. 1-37.

Vinton, G. Cerf, "Packet Satellite Technology Reference Sources", Request for Comments 829, Nov. 1982, http://www.cis.ohio-state.edu/htbin/rfc/rfc829.html, pp. 1-5.

VocalTec internet Phone (TM) Version 2.5 Readme, VocalTec Ltd., Feb. 1995, 5 pages.

Written Opinion issued Feb. 12, 1998 in corrresponding International Application Serial No. PCT/US96/15504.

David Strom, "Talking Telephony", Windows Sources, Ziff-Davis Publishing Company, Sep. 1996, vol. 4, No. 9, pp. 6, 7, 10, 150-152, 157, 158, 163, 167, 171, 174, 181, 184, 186, 195, 203, 208.

Emad Farag et al., "Structure and network control of a hierarchical mobile network architecture", IEEE Fourteenth Annual International Phoenix Conference on Computers and Communications, Mar. 1995, ISBN: 0-7803-2492-7, pp. 671-677.

H. Schulzrinne et al., "RTP: A Transport Protocol for Real-Time Applications", Network Working Group Request for Comments 1889, Jan. 1996, 75 pages.

Huanxu Pan et al., "Analysis of a CCSS#7 Network supporting database services", IEEE International Conference on Information Engineering, Sep. 1993, ISBN: 0-7803-1445-X, pp. 193-197, vol. 1.

John E. Goodwin, Project Gutenberg Alpha Edition fo EMAIL 101, http://metalab.unc.edu/pub/docs/books/gutenberg/etext93/email025.txt, Jul. 1993.

Mark R. Brown et al. "Special Edition: Using Netscape 2", Que Publishing, 1995, ISBN 0-7897-0612-1, pp. 7-35, 37-56, 78, 83, 176, 301-320, 393, 395-467, 469-506.

Preston Gralla, "How the Internet Works", Ziff-Davis Press, Emeryville, CA, c1997, pp. 34-37, 202-205, 214-215 and 272-275, ISBN 1-56276-552-3.

Co-pending U.S. Appl. No. 08/719,639, filed Sep. 25, 1996.
Co-pending U.S. Appl. No. 08/974,329, filed Nov. 19, 1997.
Co-pending U.S. Appl. No. 09/998,742, filed Nov. 30, 2001.
Co-pending U.S. Appl. No. 09/640,406, filed Aug. 17, 2000.
Co-pending U.S. Appl. No. 10/796,335, filed Mar. 8, 2004.
Co-pending U.S. Appl. No. 08/719,891, filed Sep. 25, 1996.
Co-pending U.S. Appl. No. 08/719,898, filed Sep. 25, 1996.

* cited by examiner

METHOD AND APPARATUS FOR DYNAMICALLY BALANCING CALL FLOW WORKLOADS IN A TELECOMMUNICATIONS SYSTEM

RELATED APPLICATIONS

This application claims priority to U.S. Provisional Patent Application Ser. No. 60/114,751, filed Jan. 5, 1999, and entitled "SCALABLE CALL FLOW APPARATUS THAT DYNAMICALLY BALANCES WORKLOADS" by Linden A. deCarmo.

In addition, this application incorporates by this reference the subject matter of a U.S. utility patent application entitled "METHOD FOR DESIGNING OBJECT-ORIENTED TABLE DRIVEN STATE MACHINES", U.S. patent application Ser. No. 09/477,435, issued as U.S. Pat. No. 6,463,565, by Keith C. Kelly, Mark Pietras and Michael Kelly, commonly assigned and filed on an even date herewith.

FIELD OF THE INVENTION

This invention relates, generally, to telecommunication systems, and, more specifically, to a technique for managing call flows within a telecommunications system.

BACKGROUND OF THE INVENTION

Two fundamentally different switching technologies exist that enable communications. The first type, circuit-switched networks, operate by establishing a dedicated connection or circuit between two points, similar to public switched telephone networks (PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity. The second type, packet-switched networks, typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets. Intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

It is desirable for communications originating from an IP-based network to terminate at equipment in a PSTN network, and vice versa, or for calls which originate and terminate on a PSTN network to utilize a packet-switched data network as an interim communication medium. Problems arise, however, when a user on an IP-based or other packet switched data network tries to establish a communication link beyond the perimeter of the network, due to the disparity in addressing techniques among other differences used by the two types of networks.

To address the problems of network disparity, telecommunication gateways have been developed to allow calls originating from an IP-based network to terminate at equipment in a PSTN network, and vice versa, or for calls which originate and terminate on a PSTN network to utilize a packet-switched data network as an interim communication medium. Gateway, such as the NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fla., have a plurality of ports through which calls are handled.

Unlike traditional Public Branch Exchanges (PBXs), which merely processed the establishment of a call from one location to another, current telecommunication systems are expected to provide many types of optional services, such as call forwarding, call messaging, call waiting, and data entry, all transparently to the caller. In order to process these various functions, the gateways must be able to process the voice data stream and the call events associated with the call. Call events comprise any action related to a call, e.g. off-hook, on-hook, etc. However, it is desirable for gateway architectures to remain relatively rudimentary, performing only the handling of the data stream. Processing of the call events may be handled by a special server, referred to hereafter as a call flow server. In this manner the telecommunication systems may be updated to handle new types of call events by updating only the call flow server, instead of multiple gateways. Accordingly, gateways forward call events associated with a particular data stream to the call flow server and receive instructions from the call flow server as to how to handle or direct the data stream representing a call.

The call flow server uses algorithms known as "call flows" to handle one or more call events. A call flow typically comprises a series of instructions that control how one or more call events are processed. Such call flows are typically written in state tables, but may also be written in JAVA or any other type of computing language proprietary or not. Call flows are state machine operations that are managed on threads executing on a processor. However, the assignment of call flows to threads can cause problems.

In one technique, all call flow scripts are processed on a single thread. This solution is optimal for a single processor environment. However, this solution is not scalable as additional processing resources are added (i.e. the extra processors are ignored). In addition, a processor intensive call flow will block all other call flows from running (i.e. it is single tasking). In another technique, each call flow script is processed on a separate thread. This technique fully utilizes processor resources on multi-processor machines and ensures that a script is never blocked because another script is running. However, it has the following disadvantages: 1) excessive context switches dramatically degrade performance on single processor machines; 2) a single thread per call flow is not realistic for large call flow environments that may process tens of thousands of calls simultaneously; and 3) call flows cannot be spread among multiple threads since one must ensure that events are received in the order they were sent and this cannot be guaranteed across threads.

Accordingly, there is a need for a method and apparatus that can adjust the call flow load within a single processor or multi-processor environment such that processing of threads associated with the call flows is optimized.

There is a further need for a method and apparatus for a flexible thread manager that has the performance of the single-threaded solution on a single processor system, but which scales intelligently when processors are added.

SUMMARY OF THE INVENTION

According to the present invention, a call flow server is disclosed that processes call flow events from a plurality of gateways bridging between traditional circuit-switched networks and packet-switched networks. The call flow server server, which may be implemented with either a single processor or multi-processor design, includes call flow engine and call flow thread manager modules capable of managing a plurality of call flow events by distributing the call flow scripts associated with such events among a plurality of threads executing on the call flow server. Each call flow event in the form of a call flow script is processed on a single thread within a selected processor. Processing each call flow script on a single thread fully utilizes the processor resources and ensures that a call flow script need not be blocked while another call flow script is running. The call flow server includes a thread manager to direct a given call flow script to a thread that has excess capacity.

According to one aspect of the present invention, a method is disclosed for distributing the call flow events among the plurality of threads executing within a telecommunications server. This method is performed to increase call flow event processing efficiency and comprise the steps of: determining a call flow workload level for each of the plurality of threads; determining whether one of the plurality of threads is inefficiently handling its assigned call flow workload; and assigning call flow events from the inefficient thread to a second thread with excess call flow event handling capacity. The method may be further refined to include the steps of processing the call flow events within each of the plurality of threads or repeating selected steps until a balanced call flow event processing level is attained among the active threads.

According to another aspect of the present, a computer program product for use with a computer system may be implemented that includes program code for implementing the method steps described above. The computer program product may be distributed in the form of a computer useable medium such as a floppy disk, a CD-ROM disk, pre-installed on a hard disk storage drive of the communications server, or any other type of medium used to store data or program code for loading within a computer system, or, alternatively transmitted or propagated as part of a computer usable signal.

According to yet another aspect of the present invention, in a computer system, an apparatus for distributing call flow events among a plurality of threads, each thread having an associated call flow event queue in which call flow events queued, the apparatus comprises: a call flow engine config- ured execute call flow events associated with one of the threads; a call flow manager configured to distribute a plurality of call flow events among a plurality of threads used for managing the processing of plurality of call flows, n the call flow manager optimizing the processing of the call flows by determining which plurality of threads are operating inefficiently and reassigning a portion of the call flow events assigned to the inefficient thread to other of the plurality of threads having excess call flow processing capacity.

DETAILED DESCRIPTION

Figure 1:
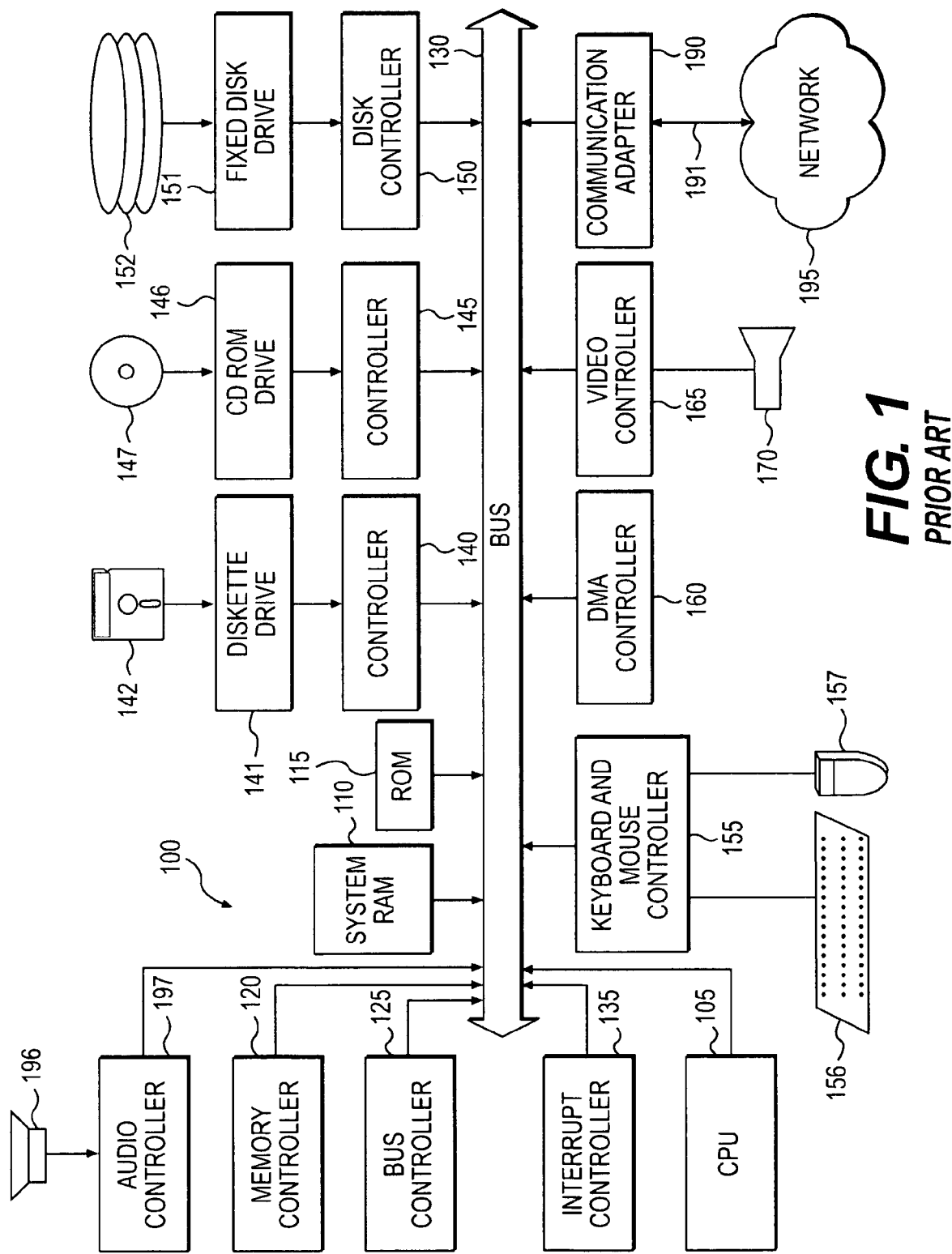
FIG. 1 is a block diagram of a computer system suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. or Windows NT operating system, available from Microsoft Corporation, Redmond, Wash. The operating system controls allocation of system resources and performs tasks such as process scheduling, memory management, and networking and I/O services, among other things. The present invention is intended for use with a multitasking operating system, such as those described above which are capable of simultaneous multiple threads of execution. For purposes of this disclosure a thread can be thought of as a "program" having an instruction or sequence of instructions and a program counter dedicated to the thread. An operating system capable of executing multiple threads simultaneously, therefore, is capable of performing multiple programs simultaneously.

In the illustrative embodiment, a call flow server server in accordance with the present invention is implemented using object-oriented technology and an operating system which supports an execution of an object-oriented programs. For example, the inventive call flow server server may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

Telecommunication Environment

Figure 2:
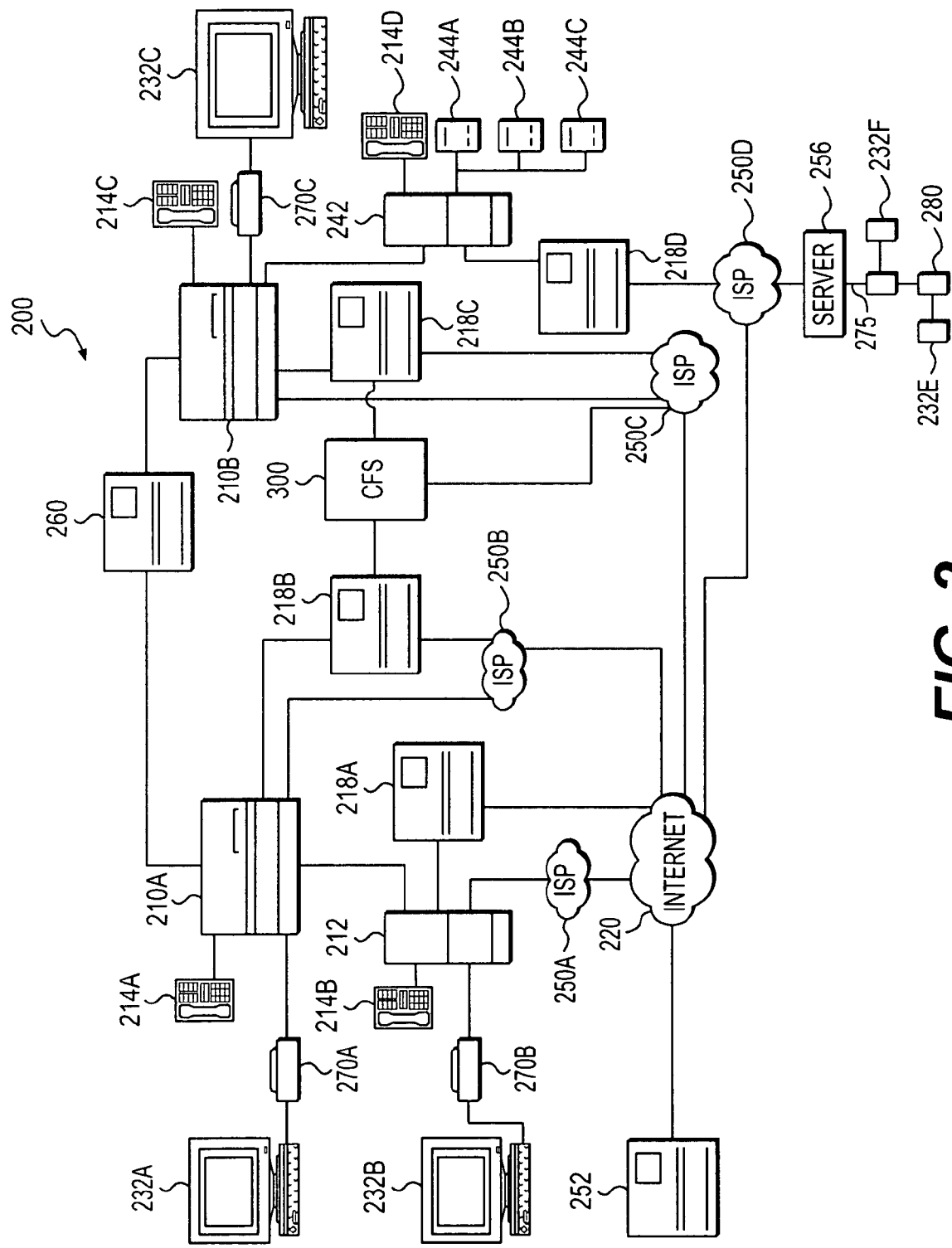
FIG. 2 is a conceptual illustration of a communications network environment in which the present invention may be utilized.

FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

A pair of PSTN central offices 210A–B serve to operatively couple various terminating apparatus through either a circuit switched network or a packet switched network. Specifically, central offices 210A–B are interconnected by a toll network 260. Toll network 260 may be implemented as a traditional PSTN network including all of the physical elements including routers, trunk lines, fiber optic cables, etc. Connected to central office 210A is a traditional telephone terminating apparatus 214A–D and an Internet telephones 232A–D. Terminating apparatus 214A–D may be implemented with either a digital or analog telephone or any other apparatus capable of receiving a call such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. The Internet telephony is conceptually illustrated as a telephone icon symbolizing the Internet telephone client application executing on a personal computer and interconnected to central office 210A via a modem 270A. Similarly, telephone 214C is connected to central office 210B and WebPhone 232C is connected to central office 210B via modem 270C. Central offices 210A–B are, in turn, operatively coupled to Internet 220 by ISP 250B and 250C, respectively. In addition, central office 210A is coupled to ISP250B by gateway 218B. Similarly, central office 210B is connected to ISP 250C by gateway 218C. In addition, a telephone 214B and Internet telephone 232B, similar to telephone 214A and Internet telephone 232A, respectively, are interconnected to Internet 220 via PBX 212, gateway 218A and ISP 250A. In addition, a global server 252, coupled to the Internet 220, may be implemented as described in U.S. patent application Ser. No. 08/719,894, entitled Directory Server for Providing Dynamically Assigned Network Protocol Addresses, incorporated herein. A global server suitable for use as Global Server 252 is commercially available from NetSpeak Corporation in the form of a collection of intelligent software modules including connection server Part No. CSR1, information server, Model ISR1, and database server, Model DBSR1. Finally, Internet Service Providers (ISPs) 250A–D may comprise any number of currently commercially available Internet service providers such as America On Line, the IBM Global Network, Compuserve, etc. An Intranet implemented as LAN 275 is coupled to Internet 220 via ISP 250D and server 256. Server 256 may have the architecture as illustrated in FIG. 1 and functions as a proxy server for LAN 275 to which WebPhone 232E is connected via a LAN-based TCP/IP network connector 280. A plurality of Internet telephone 232F and 232E are coupled to LAN 275 via LAN connectors 280.

A call flow server 300 is coupled over a packet-switched network to gateways 218A–C, as illustrated in FIG. 2. As described in greater detail hereinafter, gateways 218A–C forward call events to call flow server 300 which uses a call flow engine to efficiently handle processing of all call events. The gateways, call flow server and WebPhone client applications may be implemented as set forth in greater detail hereinafter.

WebPhone Client

Any of Internet telephones 232A–C shown in the Figures, and referred to hereafter simply as WebPhone(s), WebPhone process or WebPhone client 232, may be implemented as described in U.S. patent application Ser. No. 08/533,115 entitled "POINT-TO-POINT INTERNET PROTOCOL" by Glenn W. Hutton,—filed Sep. 25, 1995, now U.S. Pat. No. 6,108,704, incorporated herein by reference. An Internet telephony application suitable for use with the present invention is the WebPhone 1.0, 2.0 or 3.0, client software application commercially available from NetSpeak Corporation, Boca Raton, Fla. The WebPhone client comprises a collection of intelligent software modules which perform a broad range of Internet telephony functions. For the purpose of this disclosure, a "virtual" WebPhone client refers to the same functionality embodied in the WebPhone client application without a graphic user interface. Such virtual WebPhone client can be embedded into a gateway, automatic call distributor, call flow server, or other apparatus which do not require extensive visual input/output from a user and may interact with any other WebPhone clients or servers adhering to the WebPhone protocol.

The WebPhone software applications may run on the computer system described with reference to FIG. 1, or a similar architecture whether implemented as a personal computer or dedicated server. In such an environment, the sound card 197 accompanying the computer system 100 of FIG. 1, may be an Media Control Interface (MCI) compliant sound card while communication controller 190 may be implemented through either an analog modem 270 or a LAN-based TCP/IP network connector 280 to enable Internet/Intranet connectivity.

The WebPhone clients, as well as any other apparatus having a virtual WebPhone embodied therein, each have their own unique E-mail address and adhere to the WebPhone Protocol and packet definitions, as extensively described in the previously referenced related U.S. patent applications. For the reader's benefit, short summary of a portion of the WebPhone Protocol is set forth to illustrate the interaction of WebPhone clients with each other and the connection/information server 252 when establishing a communication connection.

Each WebPhone client, may serve either as a calling party or a caller party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the callee party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone client initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network. To facilitate interaction with WebPhone clients, a virtual WebPhone is implemented in the gateways 218A–C, as described hereinafter.

Gateways 218A–C shown in the Figures, any of which is referred to hereafter simply as gateway 218 acts as a proxy device and includes voice processing hardware that bridges from an IP-based network to a PSTN network. The gateway 218 may be implemented with either a microprocessor based architecture or with dedicated digital signal processing logic and embedded software. A gateway suitable for use as gateway 218 with the present invention is either NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fla. Gateway 218 may be implemented using a computer architecture similar to computer system 100 described with reference to FIG. 1.

In addition, gateway 218 comprises one or more voice cards, one or more compression/decompression (codec) cards, and a network interface. The voice card(s) provides a T-1 or analog connection to the PBX or central office or analog telephone lines which have a conventional telephony interface, for example, DID, ENM. The voice card application program interface enable the instance of gateway 218 to emulate a conventional telephone on a PBX or central office of a PSTN carrier. Multichannel audio compression and decompression is accessed by gateway 218 via application program interfaces on the respective sound cards and is processed by the appropriate audio codec. Any number of commercially available voice cards may be used to implement voice card(s) within gateway 218. Similarly, any number of commercially available audio codecs providing adequate audio quality may be utilized. Each instance of gateway 218 interfaces with the TCP/IP network through a series of ports which adhere to the WebPhone protocol. Gateway 218 interfaces with the T1 line of the PSTN network through the interfaces contained within the voice card(s).

One of the capabilities of the gateway 218 is to bridge between the PSTN and Internet/Intranet, and the Internet/Intranet and the PSTN. Gateway 218 virtualizes the PSTN call, making it appear as just another WebPhone client call. This virtual WebPhone process interfaces with ACD server 242 so that incoming PSTN calls can be routed to agent WebPhone processes with the tracking, distribution, and monitoring features of the ACD server 242. For incoming calls originating on a PSTN, gateway 218 provides to ACD server 242 information about incoming calls so that proper call routing can ensue, such information possibly comprising Caller ID (CLID), automatic number identification (ANI), DNIS, PBX trunk information, from the central office 210, or other information collected by voice response units. In a similar manner, gateway 218 virtualizes the PSTN call, and transmits event information associated with the call to call flow server 300. Such information may be transmitted in packetized form using, for example the WebPhone protocol, or another standard or protocol.

Call Flow Server Architecture

Figure 3:
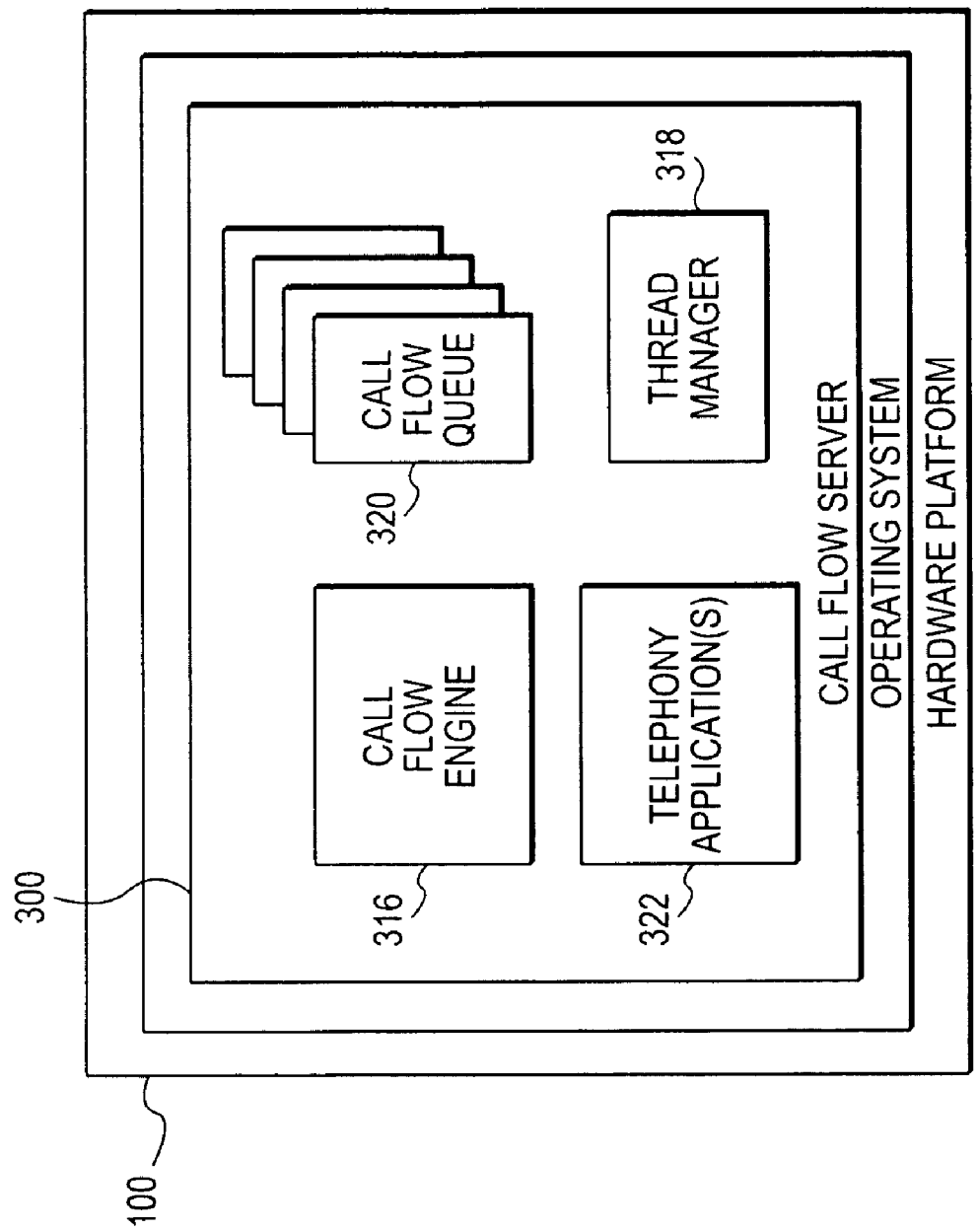
FIG. 3 is a schematic diagram of a call flow server server in accordance with the present invention.

FIG. 3 illustrates conceptually the system architecture which may be used as the call flow server 300 of FIG. 2. As Call flow server 300 may be implemented to execute on a computer architecture similar to computer system 100, as described in FIG. 1, and an operating system, such as Windows NT. Call flow server 300 comprises multiple software modules that collectably enable call processing and call handling, including call flow event processing and handling. Specifically, call flow server 300 comprises a call flow engine 316, a call flow thread manager 318, and a call flow queue 320. Optionally, an Internet telephony application 322, which may perform any telephony feature such as automatic call distribution, call waiting, call forwarding, call conferencing, caller identification, or any other telephony feature, in a manner similar to the WebPhone 232 application described previously, may be included. A server suitable for use as call flow server 300 with the present invention is NetSpeak Gate Keeper 2.1 commercially available from NetSpeak Corporation, Boca Raton, Fla. Alternatively, the call flow server of the present invention may be integrated into a number a different telecommunications apparatus, including an H.323 Standard Gatekeeper, a Session Initiation Protocol (SIP) server or a Media Gateway Control Protocol (MGCP) call agent used in packetized cable communications. As illustrated in FIG. 2, call flow server 300 may be coupled directly to gateways 218B–C through a LAN or other network. Alternatively, call flow server 300 may be coupled to gateway 218A through the Internet, as illustrated.

The call flow engine 316 executes one or more call flow events, also known as call flow scripts, in order to process a call. A call flow event or script represents a state table or instruction(s) which the call flow event engine 316 executes. The call flow event state table calls functions that are provided with the script itself in a given script language, or in import libraries. Script language examples may include, but are not limited to, JAVA code, Object Oriented approaches in a language such as C++, or in any other proprietary script language. These functions can be in the form of "C" compiled library functions or script functions. If a new script begins execution at the request of a existing script, its state table takes effect.

Call flow engine 316 may execute multiple scripts concurrently. To be able to execute multiple scripts, call flow engine 316 utilizes multiple threads. At least one script executes per thread. To manage the number of scripts and to execute these multiple scripts concurrently, call flow engine 316 maintains instant information about each script concurrently executing.

Call flow scripts are ASCII based files that can be executed in an interpretive manner or compiled and executed. Call flow scripts have two components, the first is a state table while the second is a script function. The state table for a script defines the state events and their transitions. With each transition, a function or method is called. These script objects may be part of the script or they may be in an import library. A script object is made up of an event table and methods. A script object represents a single script state. Each object has a state of events they handle and are located within an event table. These events and methods are contained in an event table. A technique for designing object-oriented table driven state machines is disclosed in the previously referenced copending patent application Ser. No. 09/477,435, entitled "METHOD FOR DESIGNING OBJECT-ORIENTED TABLE DRIVEN STATE MACHINES" by Keith C. Kelly, Mark Pietras and Michael Kelly, now U.S. Pat. No. 6,463,565, commonly assigned and filed on an even date herewith.

As stated previously, call flow server 300 may be implemented to perform any telephony function such as automatic call distribution, call waiting, call forwarding, call conferencing, caller identification, etc. A further detailed description of the complete call flow server 300, including the actual data associated tables and scripts which call flow engine 316 to function as a state machine are beyond the scope of this invention and will not be set forth herein for brevity.

Call flow thread manager 318 interacts with call flow engine 316 to manage the multiple threads handling call flow events within call flow server 300. Call flow thread manager 318 distributes call flow events among the respective call flow queues associated 320. Each thread has its own call flow queue 320 which is used to store a call flow script associated with a particular event. Optionally, an additional event queue, closely coupled, with the call flow script queue may be implemented. In such a configuration, each event in the event queue contains a reference to a call flow script stored either in a table or the call flow script queue. A thread is defined as an execution path having at least one call flow instruction. Further, a thread has an associated context, which is the volatile data associated with the execution of the thread. A thread's context includes the contents of system registers and the virtual address space belonging to the thread's process. Thus, it is important to minimize thread context switches when readjusting thread call flow event handling efficiency.

Figure 4A:
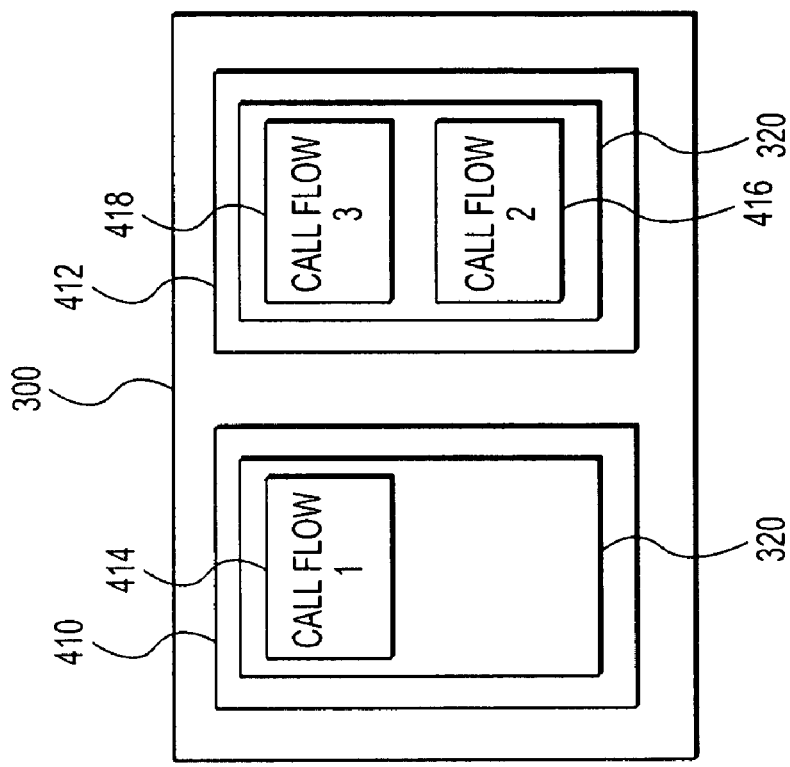
FIGS. 4A–B illustrate a schematic diagram of call flow queues, threads, and the reallocation of call flow events from one thread to another in accordance with the present invention.
Figure 4B:
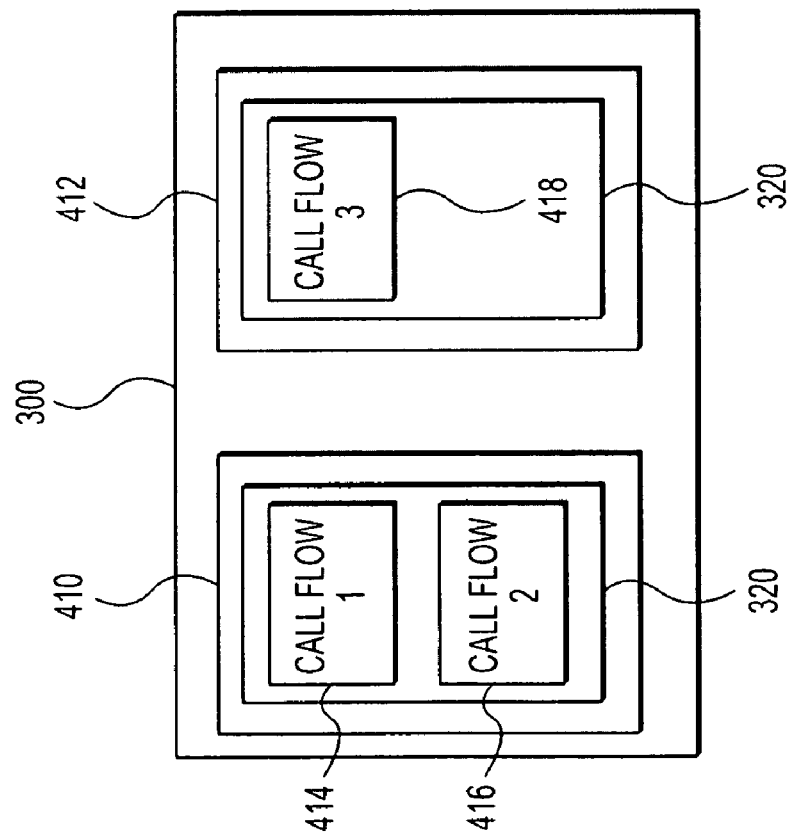

FIGS. 4A and 4B illustrates conceptually a first thread 410 and a second thread 412 within a call flow server 300 executing on either a single processor or multiple processors. Associated with each of threads 410 and 412 is a call flow queue 320 loaded with one or more call flow events. The call flow queue associated with thread 410 includes call flows 414 and 416. The call flow queue associated with thread includes call flow 418. During operation, thread 410 may experience some type of processing delay where call flow 414 is unable to be processed promptly, thus preventing call flow 416 from being processed. Reasons for processing delay may include a heavy number of events being generated by call flow execution or heavy CPU processing by a given script. In the meanwhile, thread 412 has only call flow 418 to processed in its associated call flow queue. In order to maximize efficiency of call flow server 300, the call flow thread manager 318 evaluates the two threads 410 and 412 and their associated call flow queues to determine whether a call flow event reallocation should be performed in order to optimize call flow handling by the multiple threads, as described with reference to FIG. 5. Should such an event transfer occur, the results are shown in FIG. 4B where call flow 416 has been transferred from first thread 410 to second thread 412.

Call flow thread manager 318 is configured to handle a number of threads scaling from a single thread on a single processor system to multiple threads for multiple processor systems. Furthermore, call flow thread manager 318 provides dynamic backlog detection. Specifically, if a call flow is not receiving enough processor resources, it is removed from the backlogged worker thread and added to a different thread as was shown in FIGS. 4A and 4B. Furthermore, call flow thread manager 318 provides intelligent call flow allocation. Call flow manager 318 allocates call flows based on the processor availability and processor work load. As a result, call flows are always allocated to the processor having the least amount of call flow load. Call flow thread manager 318 also minimizes context switches by arranging multiple call flows to run on the same thread where context is a factor in the thread processing.

Figure 5:
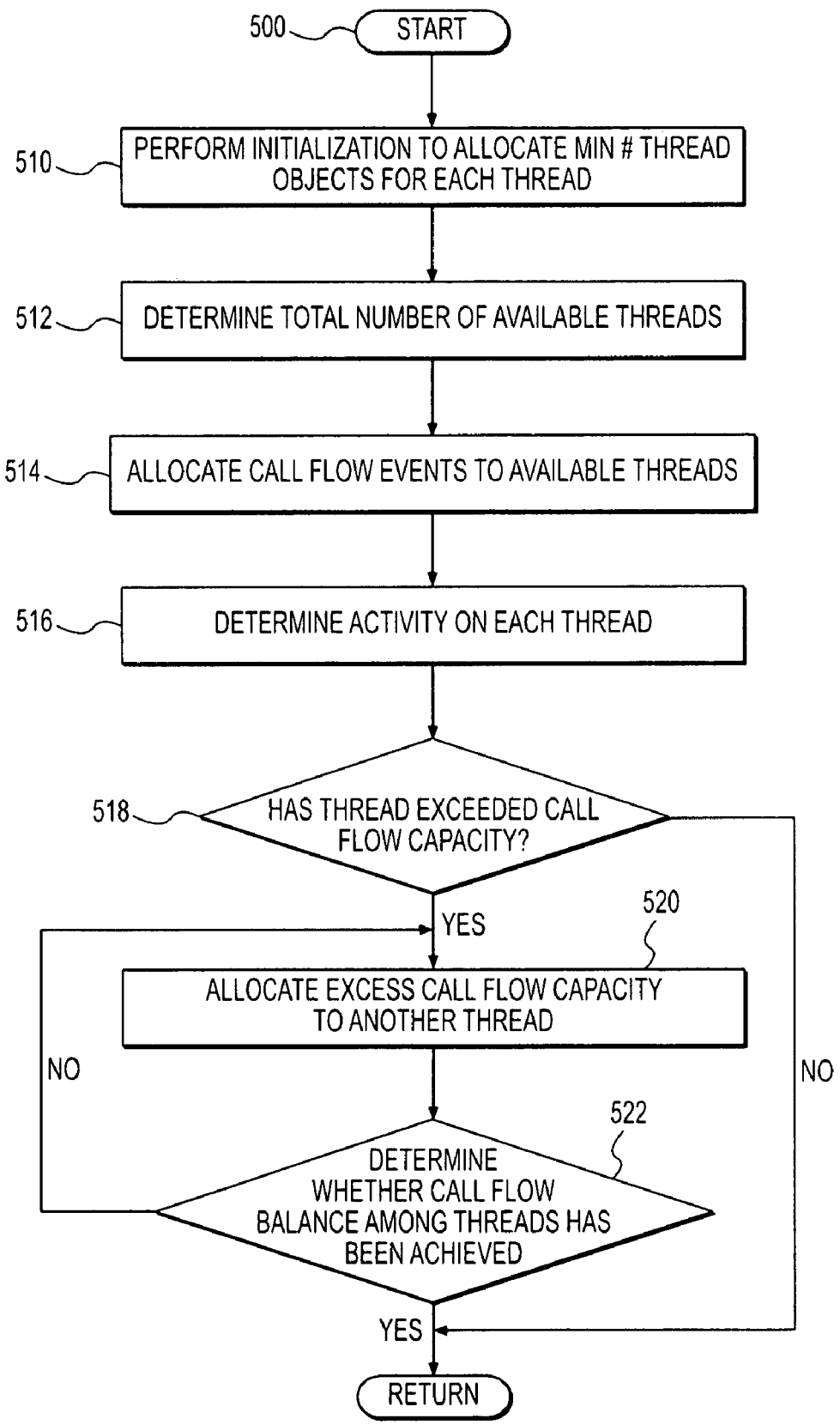
FIG. 5 is a flow chart depicting the method for allocating thread resources in accordance with the present invention.

FIG. 5 is a flowchart of the process steps performed by call flow thread manager 318 to manage a plurality of threads within the telecommunications server, in accordance with the present invention. After starting in step 500, call flow thread manager 318 allocates the minimum number of worker thread objects for each thread, stores the queue depth and number of client call flows for each thread, as illustrated by step 510. During step 510, several constants and variables are initialized, including MAX_THREADS, MIN_THREADS, MAX_LOAD, MAX_CALL_FLOWS, and LOAD_CHECK_FREQUENCY. MAX_THREADS defines the maximum number of threads to allocate to the service call flows. MIN_THREADS is the minimum number of threads to allocate to the service call flows. Typically, MIN_THREADS is typically equal to the number of processors in the system or the number of threads that can be run by a single processor in a single processor system. MAX_LOAD defines the maximum event queue depth for a worker thread. The event queue depth measures the delay experienced on a given thread when serving events for a given call flow. MAX_CALL_FLOWS define the maximum number of scripts that may be allocated to a thread. The call flow thread manager 318 prevents any thread from processing more than the max number of call flows defined by MAX_CALL_FLOWS, however, under heavy load conditions, this quantity may be exceeded, as necessary. The LOAD_CHECK_FREQUENCY controls the frequency that the event queue size is checked and is adjusted on various performance reasons such as minimum acceptable delay for processing a call flow or based on the number of threads that are actually available for processing call flows. To perform the above described initialization process call flow event manager 318 may execute the pseudo-code example set forth below:

```
static initialization (once per run):
        allocate MIN_THREADS number of worker thread objects
        for each thread, store queue depth and number of client call flows
script constructor:
call attachToThread( )
attachToThread:
set the following variables:
minscripts = MAX_SCRIPTS_PER_THREAD;
minload = HEAVILY_LOADED_QUEUE;
call findBestThread( ) to get the optimal thread for this call flow
// if minscripts == MAX_SCRIPTS_PER_THREAD or
      minload == HEAVILY_LOADED_QUEUE)
if (there's no room in the current threads)
{
    if (the total # of worker threads < MAX_THREADS)
        Allocate a new worker thread
        store queue depth and number of client call flows (0)
    else    // fit the call flow into a fully loaded queue
            // find the thread with the fewest scripts and least call
            // flow backlog
            // tell findBestThread to return ANY thread even if all are
            //loaded it won't do this normally
            findBestThread( );
}
else
{
    attach this script to the worker thread
}
```

After the initialization has been performed in step 510, the call flow manager proceeds to step 512 to determine the number of available threads. After determining the total number of available threads, the call flow manager proceeds to step 514 where it allocates call flow events to the available threads within call flow server 300. Once call flow allocation has been performed, call flow event manager 318 determines the activity on each thread within call flow server 300, as illustrated by step 516.

Once the call flow thread manager 318 determines the activity on each thread, it determines whether any one thread or more has exceeded its maximum call flow capacity, as illustrated by step 518. To perform such a determination, call flow event manager 318 may execute the pseudo-code example set forth below:

```
workersMaxedOut: quick check to see if all threads are at capacity
set maxedOut = true
if (active worker threads equals MAX_THREADS)
    {
        loop through all the threads
        {
            grab the queue size of the thread
                if (the queue size is less than the max permitted backlog
                AND total # of client call flows < MAX_SCRIPTS_
                PER_THREAD)
            {
                //this thread still has capacity for more client
                //call flows
```

```
                maxedOut = false;
        exit loop
            }
        }
    }
else
{
            maxedOut = false;
}
return maxedOut;
```

If no thread has exceeded its given call flow capacity, thread manager 318 returns to monitor the thread activity. If a thread has exceeded its call flow capacity, call flow thread manager 318 allocates the excess call flow load to another thread, as illustrated by step 520. The criteria used to allocate thread call flow load from one thread to another typically includes determining the thread having the fewest scripts and the least call flow backlog as well as the thread that has the greatest amount of resources available for use. The call flow thread manager 318 locates the thread having the greatest resources available and allocates the blocked scripts to that particular thread. To determine which thread has the greatest resources, call flow event manager 318 may execute the pseudo-code example set forth below:

```
findBestThread: searches for the thread with the lightest load
while (there are more threads to search through)
{
    grab a description of the load of the current thread
    if (this thread is running fewer call flows than the max # acceptable
    to the caller)
        grab a snap shot of the event queue size
    if (the event queue is smaller than the max event queue size
    permitted by the caller)
    {
        indicate that this script is the smallest amount we've seen so
        far
        if this thread has no clients and no backlog, exit loop since
        we've found a free thread!
    }
}
```

Otherwise, the system selects a first available thread having adequate resources for processing.

In step 522, call flow thread manager 318 determines whether a call flow balance has been achieved among the plurality of threads. If such balance has been achieved, then the call flow thread manager has performed its task and returns. If a proper balance has not been achieved, then the call flow thread manager 319 returns to step 520 to allocate call flow events among the plurality of threads until a balance is achieved. Balance is achieved when no thread exceeds MAX_LOAD.

Once the scripts have been allocated to their various threads, they are added or stored in the call flow queue associated with that thread. To add a call flow event to a call flow queue, call flow event manager 318 may execute the pseudo-code example set forth below:

```
addElement: add an event to a call flow's event queue
each call flow actually shares a queue with all of the other call flows on that thread
Increment checksize
Increment # of outstandingEvents
// we check to see if the threads should be load balanced every>
LOAD_CHECK_FREQUENCY events.
if (loadcheck > LOAD_CHECK_FREQUENCY)
    {
        queueSize = size of thread event queue
        // if the queue is heavily loaded AND our instance
        // isn't reponsible for this load AND
            // there's another thread with capacity . . .
            if (queueSize > HEAVILY_LOADED_QUEUE &&
                !(eventsOutstanding > (queueSize >> 2 )) &&
                !workersMaxedOut( ))
            {
                    remove all this call flows events from the event queue and
                    store in a temp variable.
                remove this call flow from this worker thread . . .
                    //pick the best available thread . . .
                attachToThread( );
                        // transfer our events to the new thread's //queue . . .
            }
        }
            add the requested event to the queue
    }
```

Once in call flow queue 320, the scripts are processed by the call flow engine 316 until such time as all the call flow events have been processed. Each worker thread may execute the pseudo-code example set forth below to effect processing of call flows:

```
eventProcessed: reduces # of events that still must be processed . . .
Increment # of outstandingEvents
serviceEvents: pulls an event from the queue and sends it to the
appropriate call flow for every event in the queue
        {
            retrieve the first element in the queue
            remove first element from the queue
            invoke call flow method to handle the event
            // let client know we've processed the event . . .
            eventProcessed( );
        }
run: main thread worker routine
loop forever
sleep till a call flow generates an event
serviceEvent( )
```

The reader will appreciate that the inventive algorithm described herein has the following advantages: 1) a configurable number of threads, that is, it is scalable from a single thread on a single processor systems to multiple threads for multiprocessor systems; 2) dynamic backlog detection, e.g. if a call flow is not receiving enough processor resources, it is removed from the backlogged worker thread and added to a different thread; 3) the algorithm is lightweight and almost as fast as the single processor approach; 4) call flows are allocated based on processor availability and processor workload enabling call flows to be allocated to the processor with the least load; and 5) context switches are minimized since multiple call flows can run on the same thread.

It is important to distinguish at this time that call flow events and the scripts which they are written are state events that are processed by the computer system within the telecommunications server. Call flow events are not the actual data stream of information being transmitted from one user to another in the form of either audio, video, or other type of file transfer information. Call flow events are actions that are typically requested by one of the client applications or endpoints or by the server itself. These actions typically can include call transactions such as call waiting, call forwarding, call messaging, billing for a particular client, and any other call action that is intended to be secondary to the actual calling information being carried over the call servicing network of FIG. 2. It is intended that where possible, these call flow events are processed in a manner that is reasonably transparent to the overlying purpose of the phone connection.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a computer system for internet telephony, a method, performed at a manager, of distributing call flow events among a plurality of threads, each thread having a dedicated call flow event queue in which call flow events are queued, the method comprising:
   A. determining a call flow workload level for each of the plurality of threads;
   B. determining that a first of the plurality of threads is inefficiently handling its assigned call flow workload; and
   C. reassigning a call flow event from the call flow event queue dedicated to the first thread to the call flow event queue dedicated to a second of the plurality of threads.

2. The method according to claim 1 further comprising the step:
   D. processing the call flow events associated with each of the plurality of threads.

3. The method according to claim 1 wherein step C further comprises:
   C.1 removing a call flow event from the call flow event queue associated with the first thread; and
   C.2 placing the removed call flow event in the call flow event queue associated with the second thread.

4. The method according to claim 1 wherein step C further comprises:
   C.1 selecting the second thread in accordance with the number of call flow events in the call flow event queue associated with the second thread.

5. The method according to claim 1 wherein step C further comprises:
   C.1 allocating the call flow events to a thread within the computer system with the least call flow load.

6. The method according to claim 1 wherein step B further comprises:
   B.1 determining whether the number of call flow events in the call flow event queue associated with a thread has exceeded a predetermined criteria.

7. The method according to claim 1, wherein step A comprises:
   A.1 assigning call flow events among the call flow queues associated with the respective plurality of threads in the system.

8. The method according to claim 1, further comprising:
   D. determining whether a call flow balance has been achieved among the plurality of threads;
   E. processing the call flow events associated with each of the plurality of threads.

9. A computer program product for use with a computer system for internet telephony, the computer system operatively coupled to a computer network and capable of communicating with one or more processes over the network, the computer program product comprising a computer readable medium having executable program code embodied in the computer readable medium, the executable program code being operable at a manager and comprising:
   (A) executable program code for determining a call flow workload level for each of a plurality of threads;
   (B) executable program code for determining that a first of the plurality of threads is inefficiently handling its assigned call flow workload; and
   (C) executable program code for reassigning a call flow event from the call flow event queue dedicated to the first thread to the call flow event queue dedicated to a second of the plurality of threads.

10. The computer program product of claim 9, further comprising:
    (D) executable program code for processing the call flow events within each of the plurality of threads.

11. The computer program product according to claim 9 further comprising:
    (C.1) executable program code for removing a call flow event from the call flow event queue associated within the first thread; and
    (C.2) executable program code for placing the removed call flow event in the call flow event queue associated with the second thread.

12. The computer program product according to claim 9 further comprising:
    (C.1) executable program code for selecting the second thread in accordance with the number of call flow events in the call flow event queue associated with the second thread.

13. The computer program product according to claim 9 further comprising:
    (C.1) executable program code for allocating the call flow events to a thread within the computer system with the least call flow load.

14. The computer program product according to claim 9 further comprising:
    (B.1) executable program code for determining whether the number of call flow events in the call flow event queue associated with a thread has exceeded a predetermined criteria.

15. The computer program product according to claim 9, further comprising:
    (A.1) executable program code for assigning call flow events among the call flow event queues associated with the respective plurality of threads in the system.

16. The computer program product according to claim 9, further comprising:
  (D) executable program code for determining whether a call flow balance has been achieved among the plurality of threads;
  (E) executable program code for processing the call flow events associated with each of the plurality of threads.

17. In a computer system for internet telephony, an apparatus for distributing call flow events among a plurality of threads, each thread having a dedicated call flow event queue in which call flow events are queued, the apparatus comprising:
  a processor including:
    a call flow engine configured to execute call flow events associated with one of the threads;
    a call flow manager configured to distribute a plurality of call flow events among a plurality of threads used for managing the processing of a plurality of call flows, the call flow manager optimizing the processing of the call flows by determining which of the plurality of threads are operating inefficiently and reassigning a portion of the call flow events assigned to the dedicated call event queue of the inefficient thread to the dedicated call event queue of another of the plurality of threads having excess call flow processing capacity.

18. The apparatus of claim 17 wherein the call flow manager continues to reassign call flow events until a balanced call flow event processing level is attained among the plurality of threads.

19. The apparatus according to claim 17, wherein the call flow manager determines which of the plurality of threads are operating inefficiently by determining whether any of the threads has exceeded its maximum call flow capacity.

* * * * *